US006922635B2

(12) United States Patent
Rorabaugh

(10) Patent No.: US 6,922,635 B2
(45) Date of Patent: Jul. 26, 2005

(54) METHOD AND SYSTEM FOR DETERMINING ABSOLUTE POSITIONS OF MOBILE COMMUNICATIONS DEVICES USING REMOTELY GENERATED POSITIONING INFORMATION

(75) Inventor: C. Britton Rorabaugh, Aldan, PA (US)

(73) Assignee: DRS Communications Company, LLC, Wyndmoor, PA (US)

( * ) Notice: Subject to any disclaimer, the term of this patent is extended or adjusted under 35 U.S.C. 154(b) by 0 days.

(21) Appl. No.: 10/639,022

(22) Filed: Aug. 11, 2003

(65) Prior Publication Data

US 2004/0034471 A1 Feb. 19, 2004

Related U.S. Application Data

(60) Provisional application No. 60/402,963, filed on Aug. 13, 2002.

(51) Int. Cl.[7] .............................................. G06F 19/00
(52) U.S. Cl. ....................... 701/213; 701/220; 701/225; 342/357.14; 342/957.03
(58) Field of Search ................................. 701/207, 213, 701/225, 220, 216; 342/357.14, 357.03, 357.02, 357.16

(56) References Cited

U.S. PATENT DOCUMENTS

| | | | |
|---|---|---|---|
| 5,317,321 A | | 5/1994 | Sass |
| 5,422,816 A | | 6/1995 | Sprague et al. |
| 6,072,433 A | * | 6/2000 | Young et al. ................ 342/386 |
| 6,077,433 A | | 6/2000 | Young et al. ................ 342/386 |
| 6,337,657 B1 | * | 1/2002 | Zhodzishsky et al. . 342/357.02 |
| 6,343,254 B1 | * | 1/2002 | Kirk et al. ................... 701/216 |
| 6,373,432 B1 | * | 4/2002 | Rabinowitz et al. ... 342/357.16 |
| 6,414,630 B1 | | 7/2002 | Usui |
| 6,469,663 B1 | * | 10/2002 | Whitehead et al. ..... 342/357.03 |
| 6,529,136 B2 | | 3/2003 | Cao et al. |
| 2002/0198632 A1 | * | 12/2002 | Breed et al. ................... 701/1 |
| 2002/0198659 A1 | | 12/2002 | Doyle et al. |
| 2003/0013462 A1 | | 1/2003 | Adachi |

* cited by examiner

*Primary Examiner*—Thomas G. Black
*Assistant Examiner*—Ronnie Mancho
(74) *Attorney, Agent, or Firm*—Norris, McLaughlin & Marcus

(57) ABSTRACT

Absolute positions of global position system ("GPS") enabled mobile communications devices, which form a wirelessly networked group of GPS mobiles, can be determined at each of the mobiles based on use of wireless communications capabilities of the mobiles for obtaining relative positioning information or range measurements for the mobiles of the group. Although each of the mobiles of a group cannot establish line of sight ("LOS") communications signal reception paths with more than three GPS satellites to permit each mobile to determine its absolute position solely based on GPS signal transmissions, the mobiles can compute their respective absolute positions and the absolute positions of other mobiles if a predetermined number of LOS paths can be established and range or relative positioning information can be obtained.

20 Claims, 6 Drawing Sheets

METHOD AND SYSTEM FOR DETERMINING ABSOLUTE POSITIONS OF MOBILE COMMUNICATIONS DEVICES USING REMOTELY GENERATED POSITIONING INFORMATION

CROSS REFERENCE TO RELATED APPLICATION

This application claims the benefit of U.S. Provisional Application No. 60/402,963 filed Aug. 13, 2002, assigned to the assignee of this application and incorporated by reference herein.

FIELD OF THE INVENTION

The present invention relates generally to determining positions of objects and, more particularly, determining absolute positions of a plurality of wirelessly networked mobile communications devices at the mobiles themselves using positioning information signals transmitted from a remote location and the wireless communications capabilities of the mobiles.

BACKGROUND OF THE INVENTION

Groups of individuals, such as police officers, firefighters, rescue workers or soldiers, often need to conduct operations in built up urban areas. While operating in such areas, the individuals often find it difficult or impossible to maintain accurate and updated knowledge of one another's locations because the structures in an urban area block visual contact between the individuals. As a result of the inability to establish visual contact, soldiers in urban environments often become casualties of friendly fire. Similarly, police officers, firefighters and soldiers are not able to assist fallen comrades who may be nearby, yet cannot be visually observed.

Current electronic position location systems do not provide a satisfactory solution to the problem of providing an individual, who is part of a group of individuals, with current information as to the absolute positions of other individuals in the group when the individuals of the group are located in an urban environment where visual contact among and between individuals of the group is difficult or not possible. For example, the well known global positioning system ("GPS"), which includes orbitting GPS satellites that transmit positioning information signals for receipt by a GPS enabled communications device on land, provides that a GPS enabled communications device can compute its absolute position ("GPS fix"), in terms of latitude, longitude and altitude, based on receipt of GPS information signals transmitted from the GPS satellites. Based on currently available GPS fix computation techniques, however, a GPS enabled communications device can compute its GPS fix only if it can receive GPS information signals transmitted from at least four GPS satellites.

In urban areas, an individual carrying a GPS enabled device often moves to locations that do not permit the GPS enabled device to receive GPS information signals transmitted from at least four GPS satellites. For example, natural terrain or man-made structures in an urban environment often attenuate or block signals transmitted from GPS satellites. Therefore, a group of individuals, each carrying a GPS enabled device, cannot always rely upon the computation of a GPS fix at each individual of the group, and the communication of the GPS fix from one individual to other individuals of the group, such as by wireless means, to ensure that each individual of the group continuously is aware of the absolute positions of other individuals in the group.

Therefore, a need exists for system and method for determining the absolute positions of individuals who are members of a group, where none of the individuals of the group can receive remote positioning information signals transmitted more than three remote positioning information signal transmission sources, such as GPS satellites, to permit a communications device carried by an individual of the group to determine its absolute position solely based on the remote positioning information signals that it can receive.

SUMMARY OF THE INVENTION

In accordance with the present invention, where each of first and second mobile communications devices cannot receive positioning information signals transmitted from more than three positioning information signal transmission sources, which are located remotely from the first and second mobiles, to determine its absolute position in the absence of any other positioning information, the first mobile determines its absolute position and the absolute position of the second mobile based on (i) information obtained from wireless communications between the first and second mobiles, and (ii) the first and second mobiles, in combination, receiving positioning information signals transmitted over a predetermined number of line of sight ("LOS") communications signal reception paths that are established with remote positioning information signal sources which are visible to the first mobile or the second mobile. The first mobile wirelessly communicates the computed absolute positions of the first and second mobiles to the second mobile, such that individuals carrying the first and second mobiles, respectively, are aware of their respective absolute positions.

In accordance with a first aspect of the present invention, a first mobile communications device computes its absolute position and the absolute position of a second mobile communications device where (i) each of the first and second mobiles has global positioning system ("GPS") and wireless communications signal receiving capabilities, a time of day clock and data and signal processing capabilities; (ii) the first and second mobiles, in combination, can receive GPS information signals transmitted from as few as three GPS satellites; (iii) the first and second mobiles can establish at least five LOS paths to the as few as three GPS satellites; and (iv) the first and second mobiles, using their wireless communications capabilities, can determine, or obtain information representative of, their relative positions.

In accordance with a second aspect of the present invention, a first mobile communications device computes its absolute position and the absolute position of a second mobile communications device, where (i) each of the first and second mobiles has GPS and wireless communications signal receiving capabilities, a time day of clock and data and signal processing capabilities; (ii) the first and second mobiles, in combination, can establish, using their wireless communications capabilities, LOS communications paths to at least six GPS satellites; (iii) each of the first and second mobile, using their wireless communications capabilities, can determine the distance ("range") separating each other; and (iv) the first or second mobile can determine their relative clock bias.

In a preferred embodiment, a GPS enabled mobile includes a position processing module coupled to a wireless data transceiver module and a GPS and wireless communications signal ranging transceiver module. The ranging transceiver module communicates wirelessly with the ranging transceiver module of a second GPS enabled mobile, which is preferably a part of the same wirelessly networked group, to obtain information for computing the range between the mobiles. In addition, the ranging transceiver module establishes LOS paths with each visible GPS satellite and receives GPS positioning information signals transmitted from the GPS satellites on these LOS paths. The wireless data transceiver module receives relative position information or, optionally, range information obtained from wireless communications with the second mobile, from the data transceiver of the second mobile. The position processing module includes a time of day clock and GPS satellite orbital position data. The position processing module computes its absolute position ("GPS fix") and also the GPS fix of the second mobile, based on the stored GPS satellite orbital information, positioning information obtained from the received GPS signals and at least one of the range and the relative position information for the second mobile.

In a preferred embodiment, the mobile wirelessly transmits the computed GPS fixes to other mobiles of the group or to a remote communications device.

BRIEF DESCRIPTION OF THE DRAWINGS

Other objects and advantages of the present invention will be apparent from the following detailed description of the presently preferred embodiments, which description should be considered in conjunction with the accompanying drawings in which like references indicate similar elements and in which.

DETAILED DESCRIPTION OF THE INVENTION

For purposes of highlighting the features of the present invention, a summary of the prior art technique for computing the absolute position ("GPS fix") of a communications device having GPS signal receiving capabilities, based on GPS positioning information signals received at the device from at least four GPS satellites, is initially described below in connection with FIGS. 1 and 2.

Figure 1:
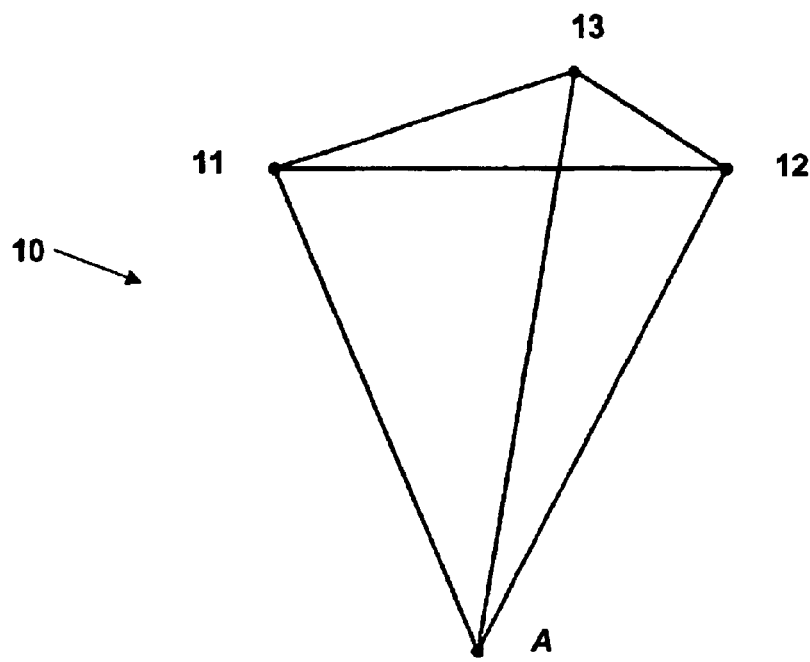
FIG. 1 is an illustration of a geometric shape defined by ranges measured between a GPS enabled mobile communications device and three GPS satellites.
Figure 2:
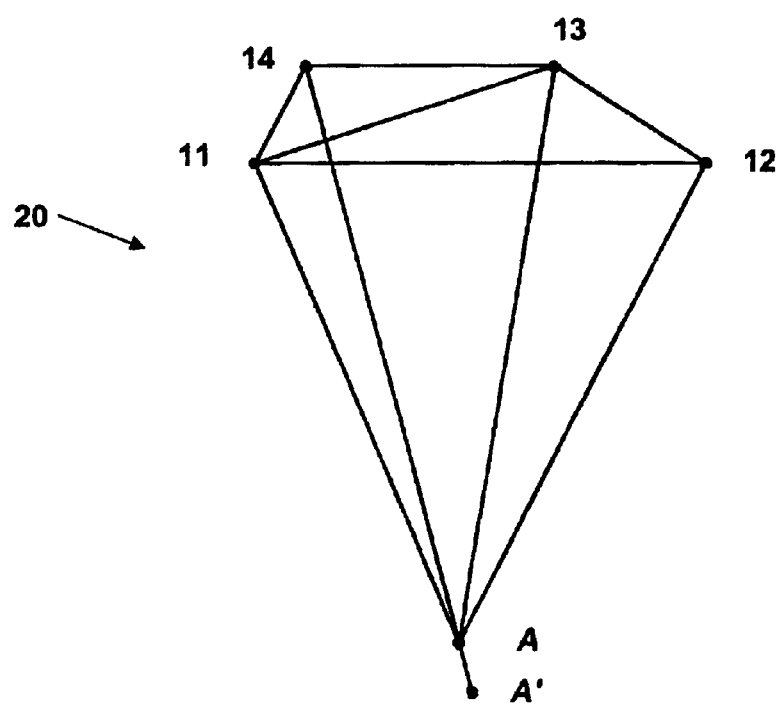
FIG. 2 is an illustration of the geometric shape of FIG. 1 including a fourth GPS satellite and indicating the effect of the assumed GPS clock bias on the assumed position of the GPS mobile.

FIG. 1 illustrates an exemplary GPS configuration 10 including a GPS enabled receiver A positioned so that it can establish LOS paths to three GPS satellites 11, 12 and 13. For ease of reference, the symbols used to identify the positions of GPS mobiles and GPS satellites that are shown in the drawings discussed below are the same as the reference numerals used to identify the GPS signal receivers and the GPS satellites themselves. As is well known in the art, each of the GPS satellites 11, 12, 13 includes a time of day clock and transmits known pseudorandom ("PN") patterns at respective predetermined times of day. For simplicity, it is assumed that the clocks of the GPS satellites 11, 12 and 13 are sufficiently synchronized to one another so that they can be considered to be exactly synchronized. The GPS receiver A includes orbital ephemeris data in its memory from which it can compute, with great accuracy, the orbital positions of the GPS satellites 11, 12 and 13 at predetermined times. The GPS receiver also includes a time of day clock, and expects to receive a predetermined PN pattern at a predetermined time from a particular GPS satellite. The GPS receiver A correlates the expected PN pattern and the received PN pattern to determine precisely when the PN pattern was received from the GPS satellite. If the respective time of day clocks in each of the GPS satellites and in the GPS receiver are exactly synchronized, the propagation delay for the GPS signal transmitted from each of the GPS satellites 11, 12 and 13 to the GPS receiver A can be readily computed. As radio frequency signals travel at a constant velocity, the range from each of the GPS satellites 11, 12 and 13 to the GPS receiver A can be computed from the propagation delays using well known techniques. The three measured ranges, A-11, A-12, and A-13, always define a unique point A. As the GPS receiver A can compute the known orbital positions of the GPS satellites at predetermined times based on orbital data stored in its memory, the ranges between the three GPS satellites 1, 2 and 3, respectively, and the GPS receiver A can be represented as the tetrahedral configuration 10 shown in FIG. 1.

In reality, however, an unknown offset error or bias exists between the clock of the GPS receiver A and the clocks of each of the GPS satellites 11, 12 and 13. FIG. 2 illustrates a configuration 20, which includes the GPS receiver A and the GPS satellites 11, 12 and 13 and indicates the effect that clock bias has on the configuration 10 of FIG. 1. Referring to FIGS. 1 and 2, the position of the GPS receiver A, which constitutes the vertex of the tetrahedron 10, is displaced by some unknown amount from the true GPS receiver A location at A', based on the clock bias. Referring to FIG. 2, if the GPS receiver A can establish an LOS path to a fourth GPS satellite 14, such that the range from the GPS receiver A to the GPS satellite 14 can be determined, this measured range, in general, will not be an exact match for the distance that can be computed between the known position of the GPS satellite 14 and the unique location of A defined by the ranges to the GPS satellites 11, 12, and 13. As is known in the art, least squares techniques can be used to compute the estimated GPS receiver A position (x, y, z) and the clock offset s that produces the best fit, in a least squared error sense, with the set of the four range measurements. In general, as ranges to more GPS satellites are added to the calculation, the best fit continues to improve. It is noted that a set of only four range measurements is needed to compute a useful estimate of the position the GPS receiver A.

Thus, the absolute position of an object having GPS receiving and data processing capabilities, such as an individual carrying the GPS enabled receiver A, can be computed using GPS positioning information signals, which permit measurement of the range (distance) between a GPS satellite, which orbits the earth, and a GPS receiver, which is positioned on or near the surface of the earth, based on determination of the time that it takes for a radio signal to propagate from the GPS satellite to the GPS receiver. The GPS receiver computes the measured distance for each satellite i, or the measured pseudorange, as $$\rho_i = c(t_R - t_{Ti}) + s + e_i \qquad (1)$$

where c is the speed of light, $t_{Ti}$ is the time that the satellite i transmits a GPS signal, $t_R$ is the time that the GPS receiver receives the signal transmitted by the satellite i and s is an error due to offset between a clock at the GPS satellite and a clock at the GPS receiver. Based on the assumption that the GPS satellite is located at some position $(x_i, y_i, z_i)$, and the GPS receiver is at position (x, y, z), the GPS receiver relates the distance to position and computes calculated pseudoranges for each of the satellites i from the following equation:

$$\rho_i = \sqrt{(x_i - x)^2 + (y_i - y)^2 + (z_i - z)^2} + s \qquad (2)$$

If the distance $\rho_i$ and positions $(x_i, y_i, z_i)$ are known for at least four different GPS satellites, the GPS receiver can solve for the GPS receiver position (x, y, z) and clock offset error s based on the system of equations obtained from the Equation (2) for i=1, 2, 3, and 4.

As solving systems of nonlinear equations, such as produced by the Equation (2) for i=1, 2, 3, 4, tends to be very difficult, Equation (2) is usually linearized by assuming values for x, y, z, and s and performing a Taylor series expansion of Equation (2) about the point (x, y, z, s) to yield $$\delta\rho_i = \alpha_{ix}\delta x + \alpha_{iy}\delta y + \alpha_{iz}\delta z + \delta s \qquad (3)$$

where $$\alpha_{ix} = \frac{x_i - x}{\rho_i - s} \quad \alpha_{iy} = \frac{y_i - y}{\rho_i - s} \quad \alpha_{iz} = \frac{z_i - z}{\rho_i - s} \qquad (4)$$

The linearized system of equations then can be represented in matrix form as $$\rho = \alpha d \qquad (5)$$

where $$\rho = [\delta\rho_1 \; \delta\rho_2 \; \cdots \; \delta\rho_N]^T$$

$$d = [\delta x \; \delta y \; \delta z \; \delta s]^T$$

$$\alpha = \begin{bmatrix} \alpha_{1x} & \alpha_{1y} & \alpha_{1z} & 1 \\ \alpha_{2x} & \alpha_{2y} & \alpha_{2z} & 1 \\ \vdots & \vdots & \vdots & \vdots \\ \alpha_{Nx} & \alpha_{Ny} & \alpha_{Nz} & 1 \end{bmatrix}$$

The GPS receiver solves the linearized system of equations for the four unknown values (x, y, z, s) using an iterative approach, such as described below.

First, the GPS receiver assumes a nominal starting position (x, y, z) and clock offset error s and initially sets all four of these values to zero. The GPS receiver computes an estimated range, $r_i$, from each GPS satellite visible, i.e., for which a LOS path can be established, to the GPS receiver using correlation of PN patterns and estimation of carrier phase. The GPS receiver then computes a pseudorange from each GPS satellite to the assumed GPS receiver position as $$\rho_i = \sqrt{(x_i - x)^2 + (y_i - y)^2 + (z_i - z)^2} + s \qquad (6)$$

where $(x_i, y_i, z_i)$ is the position of the GPS satellite i.

To solve for four unknowns, a system of linearized equations must include at least four equations. The four equations can be obtained when the GPS receiver can establish an LOS path with at least four GPS satellites. In such circumstances, the GPS receiver then can form the range delta vector $\Delta$ as $$\Delta = [\Delta_1 \; \ldots \; \Delta_N]^T$$

where $$\Delta_i = \rho_i - r_i$$

and use Equation (4) to form the $\alpha$ matrix $$\alpha = \begin{bmatrix} \alpha_{1x} & \alpha_{1y} & \alpha_{1z} & 1 \\ \alpha_{2x} & \alpha_{2y} & \alpha_{2z} & 1 \\ \vdots & \vdots & \vdots & \vdots \\ \alpha_{Nx} & \alpha_{Ny} & \alpha_{Nz} & 1 \end{bmatrix}$$

Then, the GPS receiver computes the position correction vector $d = [\delta x \; \delta y \; \delta z \; \delta s]^T$ using the well known normal equation $$d = [\alpha^T \alpha]^{-1} \alpha^T \Delta \qquad (7)$$

and computes the root mean square ("RMS") error as $$\delta v = \sqrt{\delta x^2 + \delta y^2 + \delta z^2 + \delta s^2}$$

If the GPS receiver determines that the RMS error is less than some predetermined threshold, then the GPS receiver accepts the current (x, y, z) values as the final estimated position of the GPS receiver. If the RMS error is larger than the threshold, then the GPS receiver updates the assumed values (x, y, z, s) by adding the corrections ($\delta x, \delta y, \delta z, \delta s$), and then repeats the iterative process starting from the step of computing a pseudorange using Equation (6).

It is noted that when there are exactly four equations, the system of linearized equations can be solved by finding the inverse of $\alpha$ and using $$d = \alpha^{-1} \rho$$

It is further noted that when the GPS enabled receiver can establish LOS paths with more than four GPS satellites, such that N>4, the system is over-specified and the iterative approach yields the least squares solution for Equation (5). When more than four satellites are visible, and hence more than four pseudorange equations can be generated, the system must be solved by using Equation (7) which implicitly finds and uses the pseudoinverse of $\alpha$.

In accordance with the present invention, where a group of GPS receivers collectively can receive GPS information signals from a predetermined number of GPS satellites, although not one GPS receiver of the group can receive GPS information signals transmitted from a sufficient number of GPS satellites such that the GPS receiver, solely based on the received GPS information signals, can compute a GPS fix, GPS fixes can be computed at two of the GPS receivers if relative position or range information with respect to the two GPS receivers is available.

In accordance with a preferred embodiment of the present invention, each GPS enabled mobile communications device ("GPS mobile") of a wirelessly networked group including a plurality of the GPS mobiles can compute its GPS fix and the GPS fix of another GPS mobile of the group, where none of the mobiles of the group can establish LOS paths with more than three GPS satellites, based on (i) receipt of GPS positioning information signals transmitted from a predetermined number of GPS satellites visible to either of the two GPS mobiles, and (ii) determining or exchanging range or relative positioning data with another mobile of the group using the wireless communications capabilities of the mobiles. For ease of reference, a GPS enabled mobile communications device of a group of networked mobiles, in accordance with a preferred embodiment of the present invention, is referred to generally as a mobile 101 and individual mobiles of the group are referred to as mobiles 101A, 101B, etc., and modules within the respective mobiles also are referred to using the suffixes A, B, etc.

Figure 3:
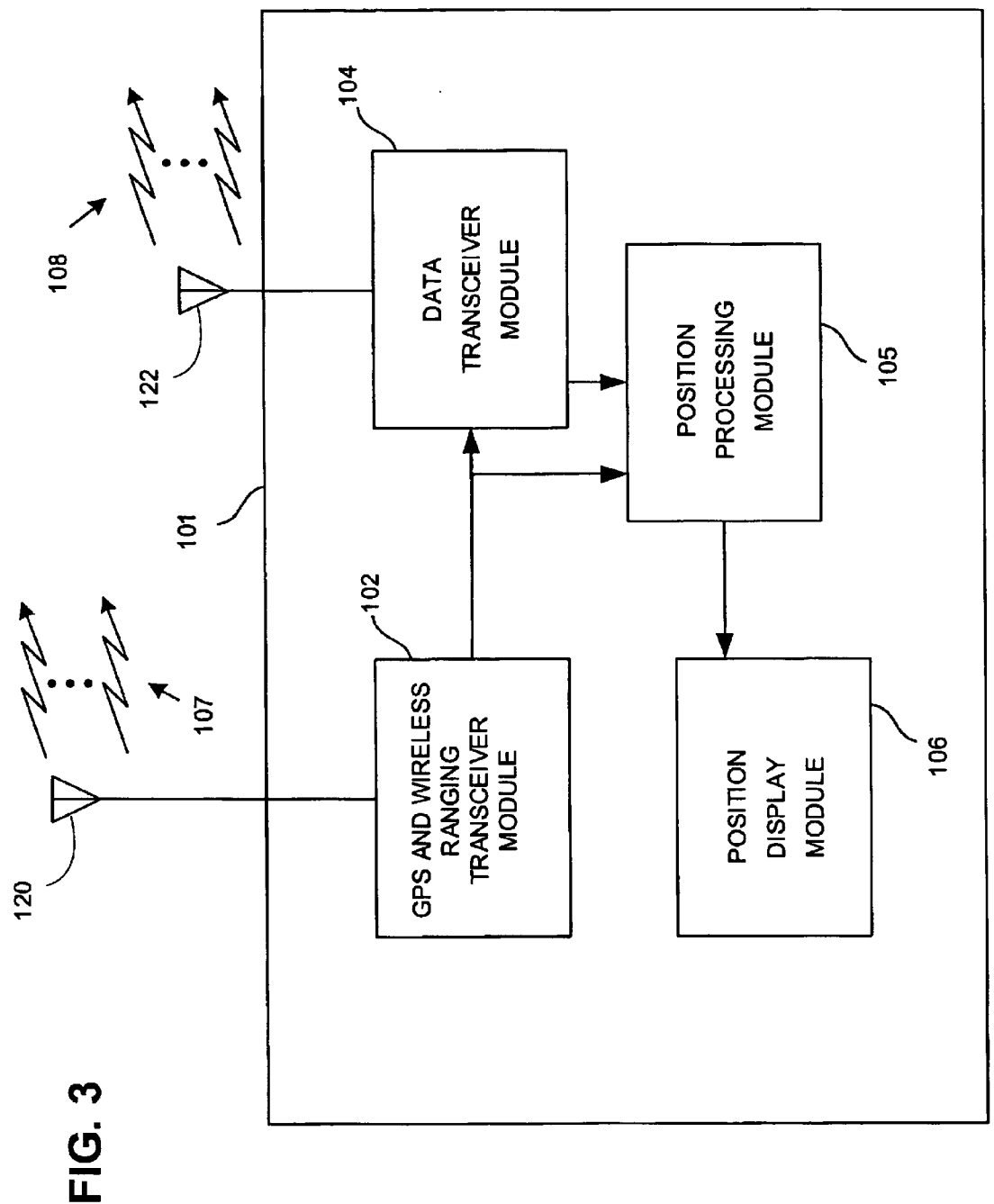
FIG. 3 is a functional block diagram of a GPS enabled mobile communications device in accordance with a preferred embodiment of the present invention.

FIG. 3 illustrates a preferred embodiment of the mobile 101 in accordance with the present invention. Referring to FIG. 3, the mobile 101 includes a GPS and wireless ranging transceiver module 102, a data transceiver module 104, a position processing module 105 and a position display module 106. The data transceiver module 104 is coupled to the ranging transceiver module 102 and the position processing module 105. The position processing module 105 is coupled to the position display module 106 and the ranging transceiver module 102. The ranging transceiver module 102 is coupled to an antenna 120 and the data transceiver module 104 is coupled to an antenna 122. It is to be understood that each of the modules of the inventive mobile 101, which are described below as performing data processing operations, constitutes a software module or, alternatively, a hardware module or a combined hardware/software module. In addition, each of the modules suitably contains a memory storage area, such as RAM, for storage of data and instructions for performing processing operations in accordance with the present invention. Alternatively, instructions for performing processing operations can be stored in hardware in one or more of the modules. Further, it is to be understood that, in accordance with the present invention, the modules of the mobile 101 can be combined, as suitable, into composite modules. Also, the antennae 120 and 122, which are conventional devices well known in the prior art, can be combined into a single integral antenna, as is also well known in the art.

The ranging transceiver module 102, which includes a conventional wireless, such as a radio frequency ("RF") signal, receiver and transmitter, collects data for determining the distance between the mobile in which it is contained and another of the other mobiles in the networked group. In addition, the ranging transceiver module 102 includes a time of day clock and GPS satellite data from which the orbital positions of GPS satellites, at any time of day, can be accurately computed. Further, the ranging transceiver module 102 receives and processes the GPS information signals transmitted from the GPS satellites visible to the mobile 101 in accordance with well known GPS techniques, which involve using the current time of day indicated at the clock of the ranging transceiver module 102. The transceiver module 102 then routes the time-indexed, processed GPS information to the position processing module 105.

In a preferred embodiment, the transceiver module 102 establishes, via the antenna 120, a wireless radio ranging link 107 between itself and the transceiver module 102 of another mobile of the group. Based on the radio raging links, the transceiver 102 measures the signal transit time between itself and the ranging transceiver module of the other mobile. From the signal time transit data, the ranging transceiver module 102 at either of the mobiles can readily compute the range between the two mobiles using well known techniques.

In a preferred embodiment, the ranging transceiver module 102 uses an RF carrier modulated by a high rate pseudorandom ("PN") pattern for ranging to another mobile. In another preferred embodiment, the signal used for ranging is an ultrawideband ("UWB") signal. UWB is advantageous because: (1) it provides virtually infinite frequency diversity, thus ensuring that the ranging signal can penetrate a wide variety of common building materials; (2) UWB signals have a low probability of detection and intercept; (3) the narrow pulse widths (500 psec) used in UWB allows for ranging accuracies to less than one foot; (4) and UWB signals can be used anywhere in the world without having to fit into or coordinate with local civilian and military frequency allocation plans.

The data transceiver module 104, which includes a conventional wireless, such as an RF signal, receiver and transmitter, wirelessly exchanges, via the antenna 122 information between itself and the data transceiver module of another mobile of the group. The data module 104 transmits its relative position with respect to the other mobile to the other mobile via a wireless data link 108 established between itself and the data transceiver module of the other mobile. The relative position may have been determined as discussed in "METHOD AND SYSTEM FOR DETERMINING RELATIVE POSITIONS OF NETWORKED MOBILE COMMUNICATION DEVICES". U.S. Ser. No. 10/641,588, flied Aug. 11, 2003, assigned to the assignee of this application and incorporated by reference herein. In addition, the data transceiver 104 transmits computed GPS fix information to the other mobile, or any other mobile of the group, as suitable, over a wireless data link 108 established between its data transceiver module and the data transceiver module of the other mobiles.

The position processing module 105 retrieves the GPS information data and any ranging data from the ranging transceiver module 102, and any range and or relative position data received at the data transceiver module 104, and uses the retrieved data to compute, as discussed in detail below, a GPS fix for itself and also for the other mobile to which the ranging or relative position data pertains.

The position display module 106 displays the absolute position of the mobile in which it is contained, and which was computed at the position processing module 105 of the mobile, and also the absolute position of another mobile that the position processing module 105 computed or which was received on a data link 108 established with the data transceiver module 104. In a preferred embodiment, the module 106 includes a display unit resembling an oversized ruggedized PDA. In a further preferred embodiment, the module 106 is not included in selected mobiles of a group.

In a preferred embodiment, the mobile 101 includes a first component structure, which does not include the antennae 120 and 122, is approximately the size of a cordless telephone handset and is configured to be worn on or attached to an article of clothing. The antennae 120 and 122 are embodied as a second component structure, preferably readily attachable to a shirt collar. The first and second component structures of the mobile 101 are electronically coupled to one another. In a further preferred embodiment, the component structures of the mobile 101 are configured to be carried in a holster to provide for easy removal for use.

In accordance with a first aspect of the present invention, each of GPS enabled mobiles 101A and 101B, by cooperatively using its wireless communications signal capabilities, computes a GPS fix for itself and a GPS fix for the other mobile when (i) the mobiles 101A and 101B, in combination, can receive GPS information signals transmitted from as few as three GPS satellites; (ii) at least five distinct LOS communications paths can be established between the mobiles 101A and 101B and the as few as three GPS satellites; and (iii) the mobiles 101A and 101B can determine or obtain information representative of their relative positions.

In a preferred embodiment of the first aspect of the invention, the relative position information is stored in the memory of the position processing module 105A and expressed in the form of values $x_{AOB}$, $y_{AOB}$ and $z_{AOB}$, such that $$x_B = x_A + x_{AOB}$$

$$y_B = y_A + y_{AOB}$$

$$z_B = z_A + z_{AOB} \quad (8)$$

Assuming that the mobile 101A can receive GPS information signals from several GPS satellites and the mobile 101B can receive GPS information signals from several GPS satellites, for either of the two mobiles 101A and 101B, a total of five unknowns exist. The unknowns are the three unknown position coordinates, ($x_A$, $y_A$, $z_A$) for the mobile 101A, or ($x_B$, $y_B$, $z_B$) for the mobile 101B, and, as the clock biases of the two mobiles 101A and 101B are independent, the two additional unknown clock biases, $s_A$ and $s_B$.

With reference to the above discussion of prior art GPS computation techniques, to solve for five unknowns, five pseudorange equations are required, such that an inverse for a can be computed. One pseudorange equation can be generated from each LOS path established between either of the mobiles 101A and 101B and one of the visible GPS satellites. In a preferred configuration which includes two GPS mobiles and three GPS satellites that are visible to the combination of the two GPS mobiles, the minimum five equations can be generated based on three GPS satellites being visible to one GPS mobile and two GPS satellites being visible to the other mobile. The two groups, however, do not have to be distinct. For example, the first mobile can establish LOS paths to three satellites and the second mobile can establish LOS paths to two of the same GPS satellites to which the first mobile can establish LOS paths. Although, in an alternative preferred embodiment, the first aspect of the invention permits computation of the GPS fixes for a configuration where the first mobile can establish LOS paths to four GPS satellites and the second mobile can establish an LOS path to only one GPS satellite, this configuration permits the first mobile to compute a GPS fix using prior art techniques as discussed above.

Accordingly, for each GPS satellite from which the mobile 101A can receive GPS information signals, the position processing module 105A constructs a linearized equation in the form of Equation (3) as follows $$\delta\rho_{Ai} = \alpha_{Aix}\delta x_A + \alpha_{Aiy}\delta y_A + \alpha_{Aiz}\delta z_A + \delta s_A \quad (9)$$

where $$\alpha_{Aix} = \frac{x_i - x_A}{\rho_i - s_A} \quad \alpha_{Aiy} = \frac{y_i - y_A}{\rho_i - s_A} \quad \alpha_{Aiz} = \frac{z_i - z_A}{\rho_i - s_A} \quad (10)$$

The position processing module 105A, using Equation (8), constructs, for each GPS satellite from which the mobile 101B can receive GPS information signals, a linearized equation of the form $$\delta\rho_{Bj} = \alpha_{Bjx}\delta x_A + \alpha_{Bjy}\delta y_A + \alpha_{Bjz}\delta z_A + s_B \quad (11)$$

where $$\alpha_{Bjx} = \frac{x_j - x_{AOB} - x_A}{\rho_{Bj} - s_B} \quad \alpha_{Bjy} = \frac{y_j - y_{AOB} - y_A}{\rho_{Bj} - s_B} \quad \alpha_{Bjz} = \frac{z_j - z_{AOB} - z_A}{\rho_{Bj} - s_B} \quad (12)$$

If the mobile 101A can receive GPS information signals from N GPS satellites and the mobile 101B can receive GPS information signals from M GPS satellites, then the mobile 101A can use Equations (9) and (11) to form a system of N+M equations having the five unknowns $x_A$, $y_A$, $z_A$, $s_A$ and $s_B$. For all cases in which N+M ≥ 5, this system can be solved using an iterative approach.

In a preferred embodiment, an estimate of the bias between the clocks that the mobiles 101A and mobile 101B use for GPS ranging can be computed in accordance with well known prior art techniques for determining the relative positions of the mobiles 101A and 101B. Based on this bias estimate, the positioning processing module 105A can expressly relate the GPS clock biases of the mobiles 101A and 101B to reduce the total number of unknowns from five to four. Consequently, GPS fixes can be computed for two GPS mobiles, where relative position information is available, when the two GPS mobiles, together, can receive GPS information from as few as three satellites and at least four LOS paths can be established between the two GPS receivers and the three GPS satellites.

Figure 4:
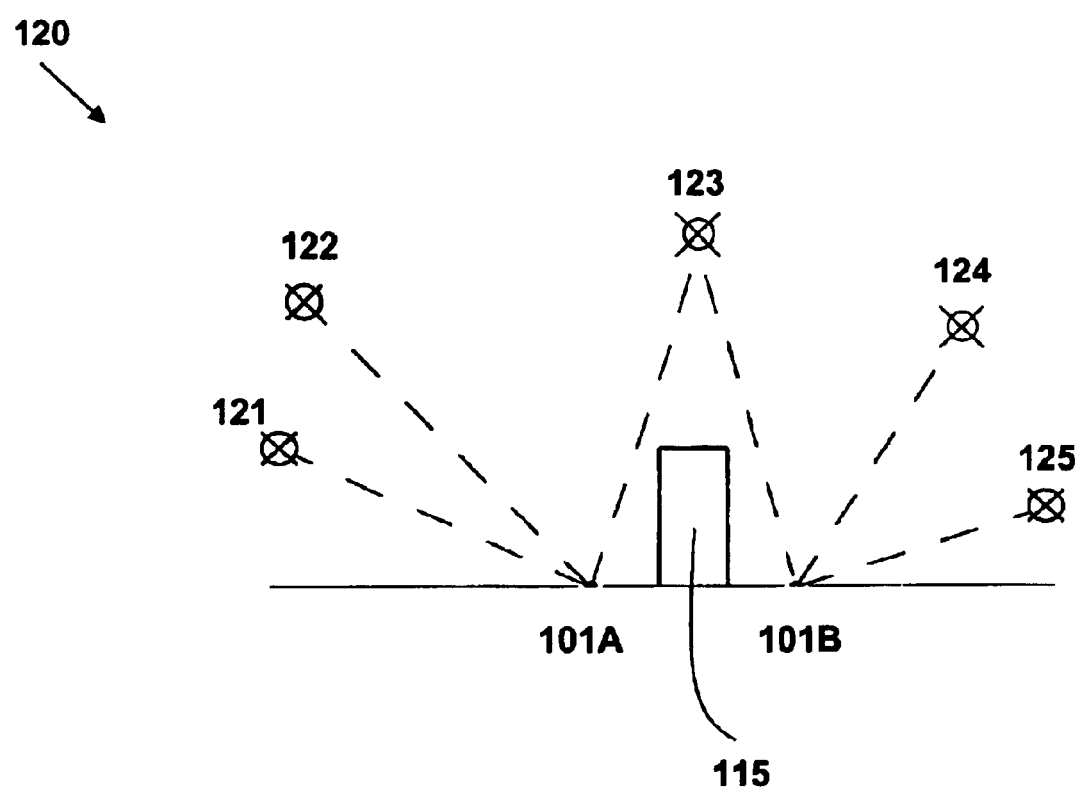
FIG. 4 is an illustration of two GPS enabled mobile communications devices, in accordance with the present invention, positioned so that LOS paths can be established to only five GPS satellites.

FIG. 4 illustrates an exemplary configuration 120 of the mobiles 101A and 101B separated by a blocking structure 115 and GPS satellites 121, 122, 123, 124 and 125, positioned in relation to the mobiles 101A and 101B and the blocking structure 115, such that the mobile 101A can establish LOS paths only to the GPS satellites 121, 122 and 123 and the mobile 101B can establish LOS paths only to the GPS satellites 123, 124 and 125. Thus, for the configuration 120, each of the mobiles 101A and 101B cannot, based solely on received GPS information signals, compute a GPS fix using prior art GPS techniques, because neither of the mobiles 101A and 101B can establish LOS paths to at least four GPS satellites.

Figure 5:
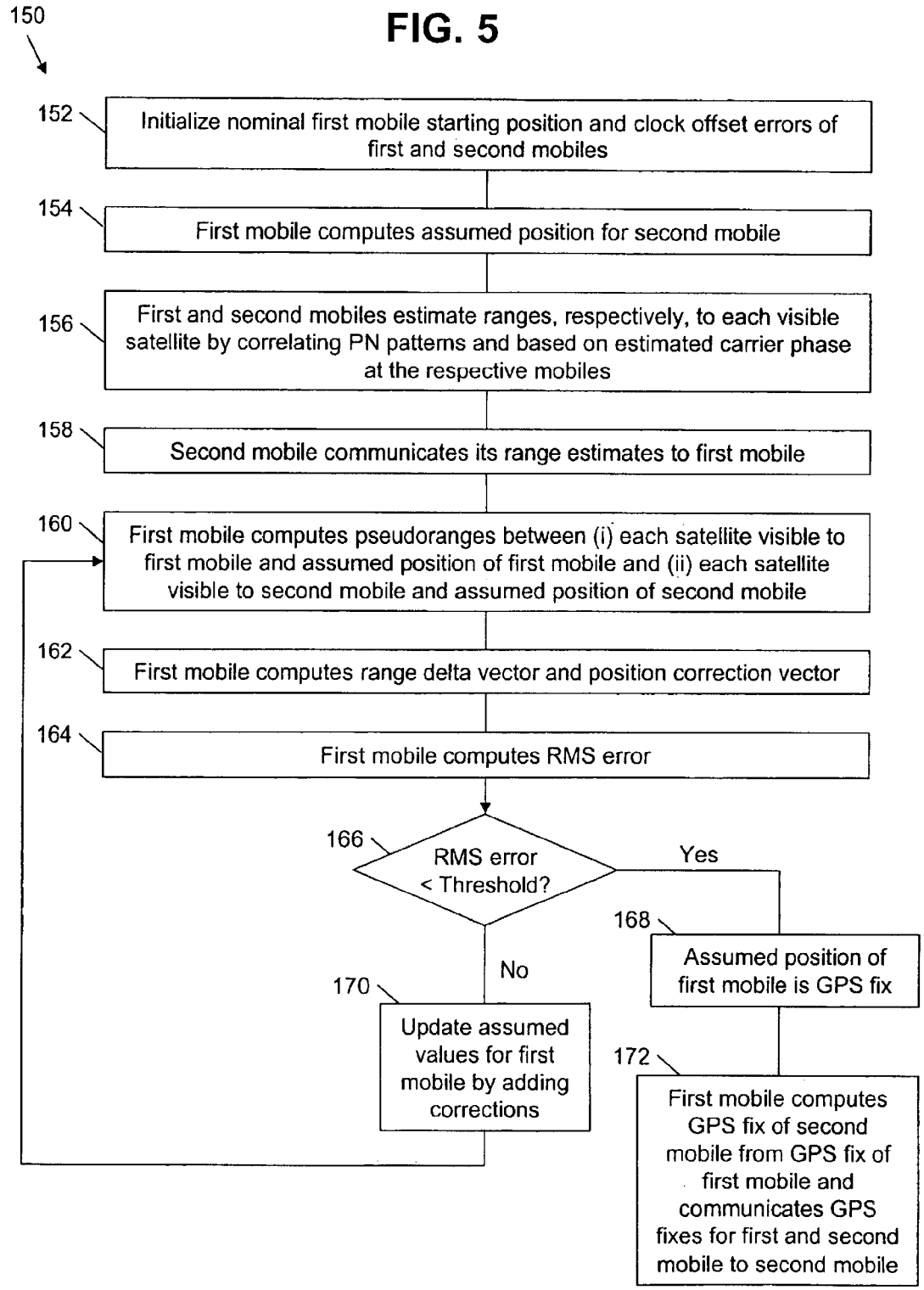
FIG. 5 is a flow diagram for computing GPS fixes for two respective GPS enabled mobile communications devices, in accordance with the present invention, where the relative positions of the two GPS mobiles are known.

FIG. 5 illustrates a preferred process 150 for computing a GPS fix for the mobile 101A and a GPS fix for the mobile 101B in accordance with the first aspect of the invention, where the mobiles 101A and 101B are positioned with respect to each other and the GPS satellites 121–125 in the configuration 120 as shown in FIG. 4, based on the relative positions of the mobiles 101A and 101B and the GPS information signals that the mobiles 101A and 101B can receive from the GPS satellites 121, 122, 123, 124 and 125. In a preferred embodiment, the mobiles 101A and 101B wirelessly communicate with each other, using their respective data transceiver modules 104, to establish direct communication links 108, which can include an indirect communication link via a relay site, through which information representative of the positions of the mobiles 101A and 101B relative to each other can be obtained. In a preferred embodiment, the mobile 101A preferably determines its position relative to the mobile 101B, or the mobile 101B wirelessly transmits the relative position information to the mobile 101A.

Referring to FIG. 5, in step 152 the position processing module 105A assumes a nominal starting position ($x_A$, $y_A$, $z_A$) for the mobile 101A and clock offset errors $s_A$ and $s_B$ for the clocks included in the respective ranging transceiver modules 102A and 102B. In step 154, the position processing module 105A computes an assumed position ($x_B$, $y_B$, $z_B$) for the mobile 101B using Equation (8).

In step 156, following usual and well known prior art techniques for GPS receiver implementation, the position processing module 105A, using results of correlation of PN patterns received at the ranging transceiver module 102A with expected PN patterns and the estimated carrier phase at the mobile 101A, estimates the range, $r_{Ai}$, between the mobile 101A and each of the GPS the GPS satellites 121, 122 and 123, which are visible to the mobile 101A. In addition, following usual and well known prior art techniques for GPS receiver implementation, the position processing module 105B, using results of correlation of PN patterns received at the ranging transceiver module 102B with expected PN patterns and the estimated carrier phase at the mobile 101B, estimates the range, $r_{Bj}$, between the mobile 101B and each of the GPS satellites 123, 124 and 125, which are visible to the mobile 101B.

In step 158, the mobile 101B communicates the estimated ranges $r_{Bj}$ to the mobile 101A by establishing a link 108 between the respective data transceiver modules 104A and 104B.

In step 160, the position processing module 105A, for each GPS satellite to which a LOS path can be established with the mobile 101A, namely, the GPS satellites 121, 122 and 123, computes a pseudorange between the visible satellite and the assumed position of the mobile 101A as $$\rho_{Ai} = \sqrt{(x_i - x_A)^2 + (y_i - y_A)^2 + (z_i - z_A)^2} + s_A \quad (13)$$

Further in step 160, the position processing module 105A, for each GPS satellite to which a LOS path can be established to the mobile 101B, namely, the GPS satellites 123, 124 and 125, computes a pseudorange between the visible satellite and the assumed position of the mobile 101B as $$\rho_{Bj} = \sqrt{(x_j - x_B)^2 + (y_j - y_B)^2 + (z_j - z_B)^2} + s_B \quad (14)$$

In step 162, the position processing module 105A forms the range delta vector $\Delta$ as $$\Delta = [\Delta_{A1} \ldots \Delta_{AN} \Delta_{B1} \ldots \Delta_{BM}]^T$$

where $$\Delta_{Ai} = \rho_{Ai} - r_{Ai}$$

$$\Delta_{Bj} = \rho_{Bj} - r_{Bj}$$

Further in step 162, the position processing module 105A, in accordance with Equations (10) and (12), forms the $\alpha$ matrix $$\alpha = \begin{bmatrix} \alpha_{Aix} & \alpha_{Aiy} & \alpha_{Aiz} & 1 & 0 \\ \vdots & \vdots & \vdots & \vdots & \vdots \\ \alpha_{ANx} & \alpha_{ANy} & \alpha_{ANz} & 1 & 0 \\ \alpha_{Bjx} & \alpha_{Bjy} & \alpha_{Bjz} & 0 & 1 \\ \vdots & \vdots & \vdots & \vdots & \vdots \\ \alpha_{BMx} & \alpha_{BMy} & \alpha_{BMz} & 0 & 1 \end{bmatrix} \quad (15)$$

and computes the position correction vector $d=[\delta x \; \delta y \; \delta z \; \delta s]^T$ using the well known normal equation $$d = [\alpha^T \alpha]^{-1} \alpha^T \Delta$$

In step 164, the position processing module 105A computes the RMS error as $$\delta v = \sqrt{\delta x^2 + \delta y^2 + \delta z^2 + \delta s^2}$$

In step 166, the position processing module 105A determines if the RMS error is less than a predetermined threshold, such as one foot. If yes, then in step 168, the position processing module 105A accepts the current position values ($x_A$, $y_A$, $z_A$) as the final estimated absolute position of the GPS mobile 101A and proceeds to step 172. If no, then in step 170 the position processing module 105A updates the assumed values ($x_A$, $y_A$, $z_A$, $s_A$) for the mobile 101A by adding the corrections ($\delta x$, $\delta y$, $\delta z$, $\delta s$) and proceeds to step 160.

In step 172, the position processing module 105A computes ($x_B$, $y_B$, $z_B$) by substituting the final absolute position values ($x_A$, $y_A$, $z_A$) for the mobile 101A into Equation (8), and then the data transceiver module 102A transmits the computed GPS fixes for the respective mobiles 101A and 101B to the data transceiver module 102B.

In a preferred embodiment, the first aspect of the invention also is applicable to a circumstance where there are more than two GPS mobiles so long as the relative positions of all of the GPS mobiles are known and can be provided to all of the GPS mobiles, which ensures that only three unknown position coordinates exist regardless of the number of GPS mobiles involved. Each additional GPS mobile, however, adds an additional unknown clock bias, such that the minimum number of LOS paths ("$N_{links}$") between the GPS receivers and GPS satellites must be three more than the number of GPS receivers ("$N_{rcvr}$") or $$N_{links} = N_{rcvr} + 3$$

Although the first aspect of the invention can be applied to any number of GPS enabled mobiles, no additional value is obtained when there are more than three GPS mobiles in a configuration. In a configuration having two GPS mobiles, the number of LOS paths can be split 3-2 or 4-1 between the two GPS mobiles. The 4-1 split permits computation of the GPS fix using the prior art technique, such that the first aspect of the invention adds value only in the case of the 3-2 split. In a configuration having three GPS mobiles, the number of required LOS paths is six and can be split 2-2-2 or 3-2-1. The split 3-2-1 corresponds to the 3-2 split for the two GPS mobile configuration with an extra GPS mobile added that can establish an LOS path to only one GPS satellite. The GPS fix can be computed using only the two GPS mobiles that account for five of the LOS paths. The 2-2-2 split adds value in configurations where each GPS mobile can establish LOS paths to two GPS satellites and none can establish LOS paths to three or more GPS satellites. In the configuration of four GPS mobiles, the required number of LOS paths is seven and can be split 3-2-1-1 or 2-2-2-1. There is no added value in this four GPS mobile configuration, as the 3-2-1-1 split can be solved as in the two GPS mobile configuration with a 3-2 split, and the 2-2-2-1 split can be solved as in the three GPS mobile configuration with a 2-2-2 split.

In accordance with a second aspect of the invention, although each of first and second GPS mobiles 101A and 101B can be in a configuration where each mobile cannot compute its GPS fix using prior art techniques requiring that at least four GPS satellites are visible and where each mobile does not have information as to and cannot compute its position relative to the other mobile, each of the mobiles 101A and 101B, working cooperatively using their respective wireless communications capabilities, can obtain a GPS fix for itself and a GPS fix for the other mobile when (i) at least six LOS paths can be established between the mobiles 101A and 101B and visible GPS satellites, and (ii) each of the mobiles 101A and 101B can compute the distance (range) between each other and the relative clock bias between the mobiles 101A and 101B.

In a preferred embodiment, the position processing module at one of the mobiles 101A and 101B computes the range, $r_{AB}$, between the mobiles 101A and 101B based on measurement of propagation times of communications signals transmitted between the ranging transceiver modules of the respective mobiles 101A and 101B. The position processing module 105A preferably computes the range $r_{AB}$ based on the average of the apparent propagation times from the mobile 101A to the mobile 101B and from the mobile 101B to the mobile 101A as follows:

$$r_{AB} = c\frac{\tau_{AB} + \tau_{BA}}{2} \tag{16}$$

The propagation times are averaged to attempt to remove the affect of any clock bias between the mobiles 101A and 101B. The position processing module 105A computes the clock bias, $b_{AB}$, as one half the difference between the mobile 101A-to-mobile 101B propagation time and the mobile 101B-to-mobile 101A propagation time, or:

$$b_{AB} = \frac{\tau_{AB} - \tau_{BA}}{2} \tag{17}$$

The relative bias error $s_{AB}=b_{AB}c$ is used to express $s_B$ in terms of $s_A$, or:

$$s_B = s_A + s_{AB} \tag{18}$$

Thus, the propagation time measurements for the mobiles 101A and 101B provide that the clock bias of the mobile 101B can be expressed as a function of the clock bias of the mobile 101A, such that there is only one unknown for clock bias.

As the relative positions of the mobiles 101A and 101B are not known, there are six unknown position values $x_A$, $y_A$, $z_A$, $x_B$, $y_B$ and $z_B$ in addition to the unknown clock bias $s_B$. Therefore, a total of seven unknown values need to be determined, which requires a minimum of seven pseudorange equations to be created. The pseudorange equations are obtained as follows. For each GPS satellite to which the mobile 101A can establish an LOS path, the position processing module 105A generates a linearized equation following the form of Equation (3) as follows:

$$\delta\rho_{Ai}=\alpha_{Aix}\delta x_A+\alpha_{Aiy}\delta y_A+\alpha_{Aiz}\delta z_A+\delta s_A \tag{19}$$

In addition, for each GPS satellite to which the mobile 101B can establish an LOS path, the position processing module 105A generates a linearized equation following the form of Equation (3) as follows $$\delta\rho_{Bj}=\alpha_{Bjx}\delta x_B+\alpha_{Bjy}\delta y_B+\alpha_{Bjz}\delta z_B+s_A+s_{AB} \tag{20}$$

where $$\alpha_{Bjx} = \frac{x_j - x_B}{\rho_{Bj} - s_A - s_{AB}} \quad \alpha_{Bjy} = \frac{y_j - y_B}{\rho_{Bj} - s_A - s_{AB}} \quad \alpha_{Bjz} = \frac{z_j - z_B}{\rho_{Bj} - s_A - s_{AB}}$$

The position processing module 105A also constructs a supplemental equation of the form $$\rho_{AB}=\alpha_{ABxA}\delta x_A+\alpha_{AByA}\delta y_A+\alpha_{ABzA}\delta z_A+\alpha_{ABxB}\delta x_B+\alpha_{AByB}\delta y_B+ \alpha_{ABzB}\delta z_B \tag{21}$$

where $$\alpha_{ABxA} = \frac{x_A - x_B}{\rho_{AB}} \quad \alpha_{AByA} = \frac{y_A - y_B}{\rho_{AB}} \quad \alpha_{ABzA} = \frac{z_A - z_B}{\rho_{AB}}$$

$$\alpha_{ABxB} = \frac{x_B - x_A}{\rho_{AB}} \quad \alpha_{AByB} = \frac{y_B - y_A}{\rho_{AB}} \quad \alpha_{ABzB} = \frac{z_B - z_A}{\rho_{AB}}$$

If the mobile 101A can establish LOS paths with N GPS satellites and the mobile 101B can establish LOS paths with M GPS satellites, then the mobile 101A, based on Equations (19), (20) and (21), can form a system of N+M+1 equations having seven unknowns, where the unknowns are $x_A$, $y_A$, $z_A$, $x_B$, $y_B$, $z_B$, and $s_A$. Referring to Equation (21), which is a pseudorange equation that is not created based on an LOS path that is established with a GPS satellite, the two mobiles 101A and 101B only need to establish LOS paths with at least six GPS satellites. For all cases where N+M≧6, the system of equations can be solved for the unknowns using an iterative least squares approach.

Figure 6:
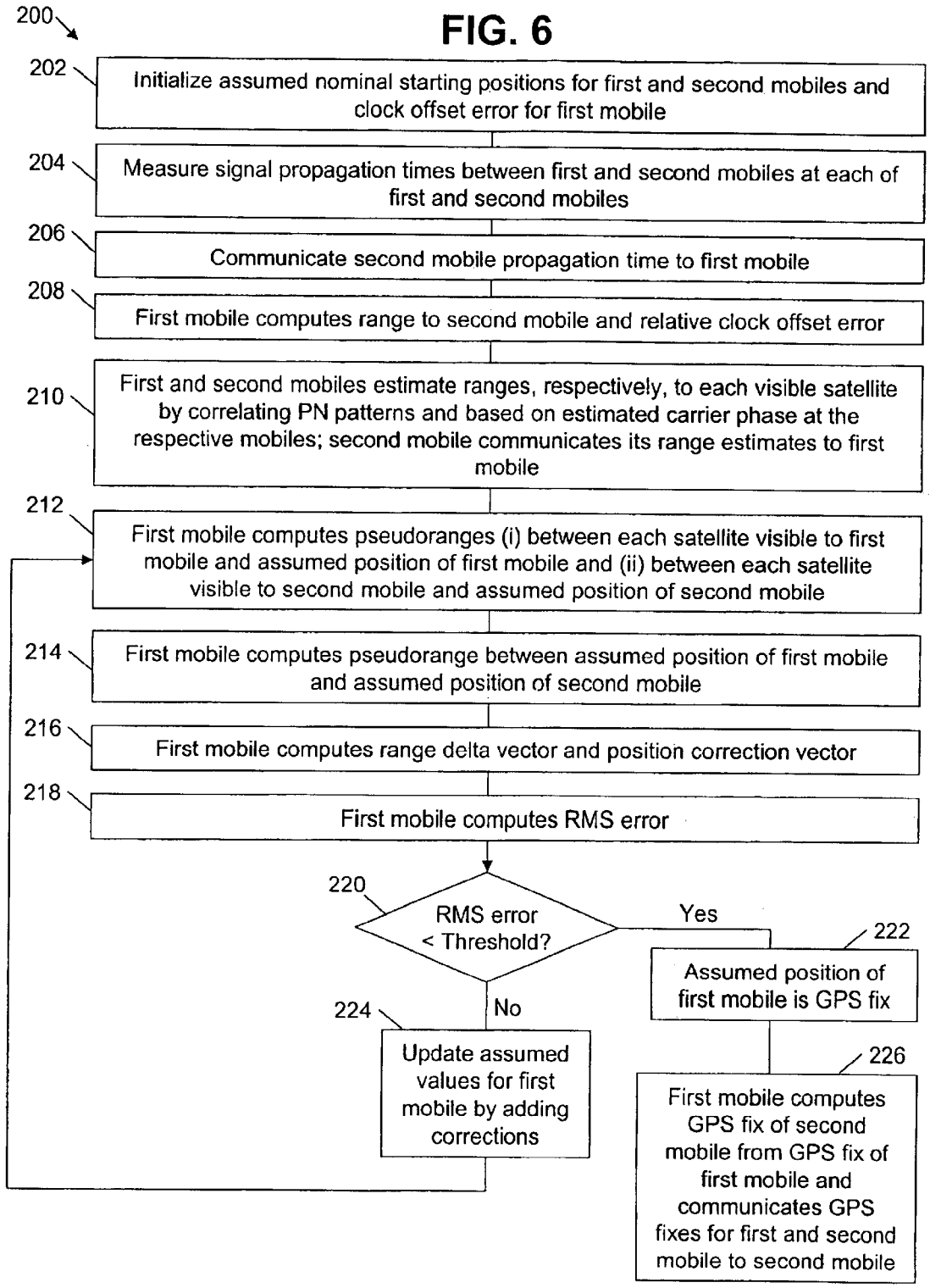
FIG. 6 is a flow diagram for computing GPS fixes for two respective GPS enabled mobile communications devices, in accordance with the present invention, where the two GPS mobiles can determine the range between each other and their relative GPS clock bias.
Figure 7:
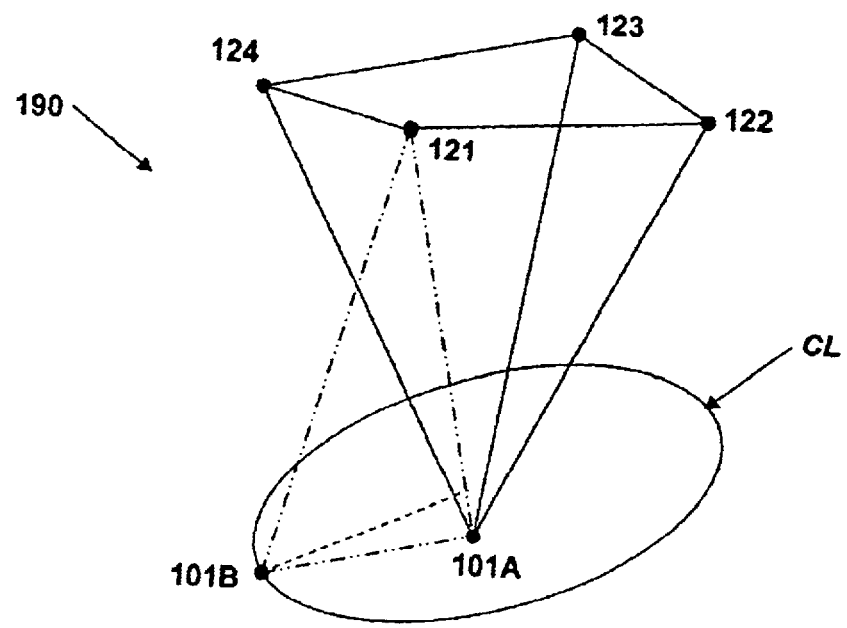
FIG. 7 is an illustration of a configuration including first and second GPS enabled mobile communications devices, in accordance with the present invention, where the first mobile can establish LOS paths to four GPS satellites and the second mobile cannot establish LOS paths to four GPS satellites.

FIG. 6 illustrates a preferred process 200 for computing GPS fixes for each of first and second GPS mobiles, in accordance with the second aspect of the invention, based on the measured range between the two mobiles, which is determined based on wireless communications between the two mobiles, where the two mobiles can establish at least six LOS paths with GPS satellites and neither of the two mobiles can establish LOS paths with at least four GPS satellites. For purposes of highlighting the features of the second aspect of the present invention, the process 200 is described below with reference to a configuration 190 as shown in FIG. 7. Referring to FIG. 7, the configuration 190 includes GPS mobiles 101A and 101B positioned in relation to GPS satellites 121–124 such that (i) the GPS mobile 101A can establish LOS paths to each of the GPS satellites 121–124, which provides that the mobile 101A can compute its GPS fix using prior art GPS techniques; (ii) the GPS mobile 101B is located within wireless communications proximity of the GPS mobile 101A, such that each of the GPS mobiles 101A and 101B can compute the range between the mobiles using conventional RF signal ranging techniques; and (iii) LOS paths only can be established between the GPS mobile 101B and each of the GPS satellites 121 and 124, such that the GPS mobile 101B cannot determine its GPS fix using prior art techniques which require receipt of GPS information signals from at least four GPS satellites.

Referring to FIG. 6, in step 202 the position processing module 105A assumes nominal starting positions ($x_A$, $y_A$, $z_A$) and ($x_B$, $y_B$, $z_B$), respectively, for the mobiles 101A and 101B and a clock offset error $s_A$ for the clock in the ranging transceiver module 102A. In step 204, the ranging transceiver modules 102A and 102B, using any suitable prior art wireless ranging technology, respectively measure the time that it takes for a signal transmitted from the mobile 101A to reach the mobile 101B, or the propagation time $\tau_{AB}$, and the time that it takes for a signal transmitted from the mobile 101B to reach the mobile 101B, or the propagation time $\tau_{BA}$.

In a preferred embodiment, the ranging transceiver module 102A transmits a time encoded wireless signal, such as an RF signal, to the ranging transceiver module 102B. Based on this transmission, the ranging transceiver module 102B can determine the time that it took for the RF signal to propagate from the mobile 101A to the mobile 101B.

In step 206, the data transceiver module 104B retrieves the propagation time data, $\tau_{AB}$, from the ranging transceiver module 102B and routes this data on a wireless link 108 to the data transceiver module 104A of the mobile 101A. The data transceiver 104A then routes the received propagation time information to the position processing module 105A for storage therein. Thus, the mobile 101A includes in its memory measurements of RF signal propagation time between the mobiles 101A and 101B, where the measurements have been made at the mobile 101A and the mobile 101B. In other words, the mobiles 101A and 101B, in steps 204 and 206, operate cooperatively to collect the propagation time data necessary for determining the range between each other.

In step 208, the position processing module 105A computes the range to the mobile 101B as $$r_{AB} = c\frac{\tau_{AB} + \tau_{BA}}{2} \quad (22)$$

and the relative clock offset error $s_{AB}$ as $$s_{AB} = c\frac{\tau_{AB} - \tau_{BA}}{2} \quad (23)$$

In step 210, the position processing module 105A performs the same computations and actions as set forth in steps 156 and 158 of the process 150 for computing estimated ranges $r_{Ai}$ and $r_{Bj}$ and for transmitting the estimated ranges $r_{Bj}$ from the mobile 101A to the mobile 101B on a wireless link 108.

In step 212, the position processing module 105A computes a pseudorange between each GPS satellite to which the mobile 101A can establish an LOS path, namely the GPS satellites 121–124, and the assumed position of the mobile 101A as $$\rho_i = \sqrt{(x_i - x_A)^2 + (y_i - y_A)^2 + (z_i - z_A)^2} + s_A \quad (24)$$

Further in step 212, the position processing module 105A computes a pseudorange between each GPS satellite to which the mobile 101B can establish an LOS path, namely the GPS satellites 121 and 124, and the assumed position of the mobile 101B as $$\rho_{Bj} = \sqrt{(x_j - x_B)^2 + (y_j - y_B)^2(z_j - z_B)^2} + s_A + s_{AB} \quad (25)$$

In step 214, the position processing module 105A computes a pseudorange between the assumed position for the mobile 101A and the assumed position for mobile 101B as $$\rho_{AB} = \sqrt{(x_A - x_B)^2 + (x_A - x_B)^2 + (x_A - x_B)^2} \quad (26)$$

In step 216, the position processing module 105A computes a range delta vector $\Delta$ as $$\Delta = [\Delta_{A1} \ldots \Delta_{AI}\Delta_{B1} \ldots \Delta_{BJ}\Delta_{AB}]^T \quad (27)$$

where $\Delta_{Ai} = \rho_{Ai} - r_{Ai}$ $\Delta_{Aj} = \rho_{Aj} - r_{Aj}$ $\Delta_{AB} = \rho_{AB} - r_{AB}$ Further in step 216, the position processing module 105A, using the Equations (10) and (21), forms the $\alpha$ matrix as $$\alpha = \begin{bmatrix} \alpha_{A1x} & \alpha_{A1y} & \alpha_{A1z} & 1 & & & & \\ \vdots & \vdots & \vdots & \vdots & & 0 & & \\ \alpha_{ANx} & \alpha_{ANy} & \alpha_{ANz} & 1 & & & & \\ \hline & & & & 1 & \alpha_{B1x} & \alpha_{B1y} & \alpha_{B1z} \\ & 0 & & \vdots & \vdots & \vdots & \vdots \\ & & & & 1 & \alpha_{BMx} & \alpha_{BMy} & \alpha_{BMz} \\ \alpha_{ABxA} & \alpha_{AByA} & \alpha_{ABzA} & 0 & \alpha_{ABxB} & \alpha_{AByB} & \alpha_{ABzB} \end{bmatrix} \quad (28)$$

and computes the position correction vector $d = [\delta x \delta y \delta z \delta s]^T$ using the well known normal equation $$d = [\alpha^T \alpha]^{-1} \alpha^T \Delta$$

In step 218, the position processing module 105A computes the RMS error as $$\delta v = \sqrt{\delta x^2 + \delta y^2 + \delta z^2 + \delta s^2}$$

In step 220, the position processing module 105A determines if the RMS error is less than a predetermined threshold. If yes, then in step 222, the position processing module 105A accepts the current values for $(x_A, y_A, z_A)$ as the final absolute position of the GPS mobile 101A and proceeds to step 226. If no, then in step 224 the position processing module 105A updates the assumed values $(x_A, y_A, z_A, s_A)$ by adding the corrections $(\delta x, \delta y, \delta z, \delta s)$ and proceeds to step 212. In step 226, the position processing module 105A computes $(x_B, y_B, z_B)$ by substituting the final values $(x_A, y_A, z_A)$ for the mobile 101A into Equation (8), and then the data transceiver module 102A transmits the computed GPS fixes for the respective mobiles 101A and 101B to the data transceiver module 102B.

Thus, referring to FIG. 7, the second aspect of the invention provides that, for first and second GPS mobiles, GPS fixes for the respective GPS mobiles 101A and 101B can be computed where the GPS mobile 101A can establish LOS paths with four GPS satellites, such that there is a 4-2 split in LOS paths for the configuration 120, and only information as to the range between the mobiles 101A and 101B, and not the relative positions of the mobiles 101A and 101B, is available or can be computed.

In an alternative configuration where two GPS mobiles 101A and 101B have a 5-1 split in LOS paths, such that the actual position of the 1 LOS path GPS mobile cannot be determined using prior art GPS techniques, adding a third GPS mobile 101C results in two new GPS mobile-to-GPS mobile pseudorange equations for $\rho_{AC}$ and $\rho_{BC}$ and three new unknowns ($x_c$, $y_c$ and $z_c$), such that one additional LOS path would be needed for computing the GPS fixes of each of the three GPS mobiles. Thus, the absolute positions of three GPS mobiles can be computed if at least seven LOS paths can be established for the three GPS mobiles, where the LOS paths can be split 3-3-1, 3-2-2 or 4-2-1. If a fourth GPS mobile 101D is added to the three GPS mobiles 101A, 101B and 101C configuration, three new pseudorange equations for $\rho_{AD}$, $\rho_{BD}$ and $\rho_{CD}$ result and three new unknowns ($x_D$, $y_D$ and $z_D$) are introduced. Consequently, no further LOS paths are required to compute the GPS fixes for each of the four GPS mobiles of the composite group, because the GPS fix of the GPS mobile 101D can be computed solely from the ranges to the GPS mobiles 101A, 101B and 101C using well known prior art techniques.

Referring to FIG. 7, the second aspect of the invention is illustrated based on the ranges that the mobiles 101A and 101B can compute. Although the ranges between the GPS mobile 101A and the GPS satellite 121, the GPS mobile 101B and the GPS satellite 121, and the GPS mobile 101A and the GPS mobile 101B can be determined, such that a triangle having lengths 101A-121, 101B-121 and 101A-101B is defined, the position of the mobile 101B cannot be computed solely from this range information. When the triangle 101A/101B/121 is swung around the axis that passes through 101A and 121, the mobile 101B traces out a circle CL and the actual location of the mobile 101B is anywhere on the circle CL. Center, X, of the circle CL is not at point 101A, but rather, at the end of the line perpendicular to 101A-121 that passes through the point 101B. In other words, a fixed distance from the GPS satellite 121 defines a sphere centered at the GPS satellite 121, and a fixed distance from point 101A defines a sphere centered at point 101A. The intersection of the two spheres is the circle CL.

Figure 8:
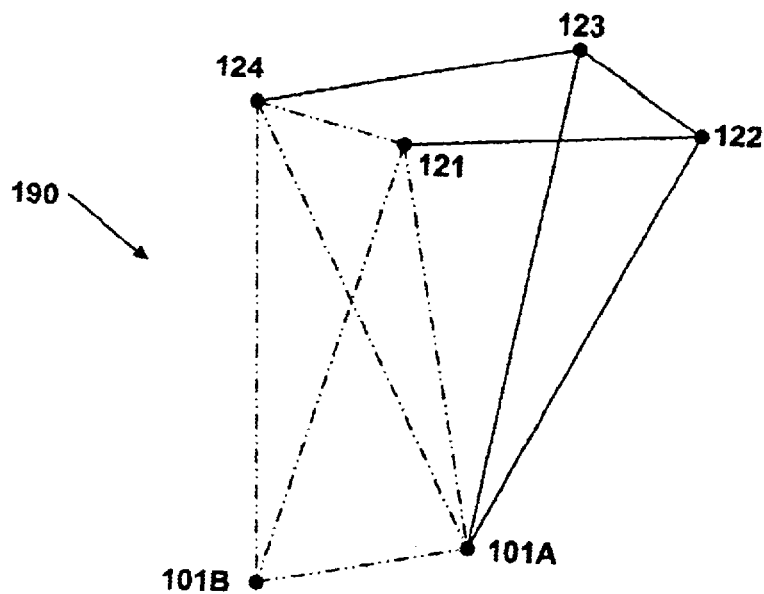
FIG. 8 is an illustration of the configuration of FIG. 7 highlighting ranges used to compute GPS fixes for the first and second mobiles, in accordance with the present invention.

Referring to FIG. 8, which illustrates further range measurements for the configuration 190 of FIG. 7, as the mobile 101B can determine its range to the GPS satellite 124, the points 101A, 101B, 121 and 124 are vertices of a tetrahedron with six known edge lengths and three fixed known vertices. The tetrahedron defines a unique location for the GPS mobile 101B which is the fourth vertex of the tetrahedron. Thus, if two GPS mobiles are separated by a known distance, the absolute positions of both of the GPS mobiles can be determined if at least six LOS paths can be established between the two GPS mobiles and four GPS satellites.

In a preferred embodiment, the GPS mobile 101 continuously computes its absolute position and the absolute position of another mobile of the group and displays these absolute positions on a handheld device that resembles a large PDA.

In a further preferred embodiment, the mobile 101 of the present invention includes long-haul radio communication capabilities at the data transceiver module, as known in the art, and communicates the computed absolute position information to another communications device, such as a remotely located communications device or another mobile in the group.

Although preferred embodiments of the present invention have been described and illustrated, it will be apparent to those skilled in the art that various modifications may be made without departing from the principles of the invention.

What is claimed is:

1. A method for determining absolute positions of respective first and second mobile communications devices, wherein each of the first and second mobiles can receive usable positioning information signals transmitted from at most three visible remotely located positioning information signal sources such that each of the first and second mobiles cannot determine its absolute position solely based on the usable received positioning information signals, the method comprising:

obtaining first-to-second mobile position information based on wireless communications between the first and second mobiles;

establishing at least a predetermined number of line of sight ("LOS") communications signal reception paths between each of the first mobile and the second mobile and and the remotely located positioning information signal sources visible to the first mobile or the second mobile; and computing the absolute positions of the respective first and second mobiles based on the first-to-second mobile position information and positioning information signals transmitted over the predetermined number of LOS paths by the sources visible to the first mobile or second mobile and received at the first mobile or the second mobile.

2. The method of claim 1, wherein the first-to-second mobile information includes the position of the first mobile relative to the second mobile, wherein the first and second mobiles in combination (i) can receive positioning information signals transmitted from as few as three visible remote positioning information signal sources, and (ii) can establish at least five LOS paths to the as few as three visible remote sources.

3. The method of claim 1, wherein the first-to-second mobile information includes range and relative clock bias between the first mobile and the second mobile, and wherein the first and second mobiles in combination can establish at least six LOS paths to remote positioning information signal sources visible to the first mobile or the second mobile.

4. A method of determining absolute positions of respective first and second global positioning system ("GPS") mobile communications devices, wherein each of the first and second mobiles can receive usable GPS positioning information signals transmitted from at most three visible GPS satellites such that each of the first and second mobiles cannot determine its absolute position solely based on the usable received GPS positioning information signals, the method comprising:

(a) providing that the first and second mobiles in combination can receive GPS information positioning signals from as few as three visible GPS satellites and that at least five line of sight ("LOS") communications signal reception paths can be established between the as few as three GPS satellites and the first and second mobiles;

(b) at the first mobile, obtaining first-to-second mobile relative position information based on wireless communications between the first and second mobiles;

(c) at the first mobile, assuming a position for the first mobile and computing an assumed position for the second mobile based on the relative position information;

(d) computing GPS range estimates at each of the first and second mobiles based on the GPS positioning information signals transmitted on the five LOS paths;

(e) wirelessly communicating the GPS range estimates computed at the second mobile to the first mobile; and (f) computing absolute positions of the respective first and second GPS mobiles using a system of pseudorange equations including at least five pseudorange equations, wherein the five equations respectively correspond to the five LOS paths and include the assumed positions of the respective first and second mobiles.

5. The method of claim 4 further comprising:
(g) computing a root mean square error ("RMS") associated with the estimated absolute position of the first GPS mobile;
(h) updating the assumed values for the first mobile if the RMS error exceeds a predetermined threshold; and
(i) repeating steps (d), (e) and (f).

6. The method of claim 4 further comprising;
(g) computing a root mean square error associated with the estimated absolute position of the first GPS mobile; and
(h) communicating the absolute positions of the first and second mobiles from the first mobile to the second mobile if the RMS error does not exceed a predetermined threshold.

7. A method of determining absolute positions of respective first and second global positioning system ("GPS") mobile communications devices, wherein each of the first and second mobiles can receive usable GPS positioning information signals transmitted from at most three visible GPS satellites such that each of the first and second mobiles cannot determine its absolute position solely based on the usable received GPS positioning information signals, the method comprising:
(a) providing that the first and second mobiles together can establish at least six line of sight ("LOS") communications signal reception paths with visible GPS satellites;
(b) assuming nominal positions for the respective first and second mobiles and a GPS clock offset for the first mobile;
(c) at the first mobile, measuring signal propagation time between the first mobile and the second mobile based on transmission or wireless communications signers from the first mobile to the second mobile;
(d) at the second mobile, measuring signal propagation time between the first mobile and the second mobile based on transmission of communications signals from the second mobile to the first mobile and wirelessly transmitting the measured propagation time at the second mobile to the first mobile;
(e) at the first mobile, determining range between the first and second mobiles based on the signal propagation times measured at the first and second mobiles;
(f) computing GPS range estimates at each of the first and second mobiles based on the GPS positioning information signals transmitted on the six LOS paths;
(g) wirelessly communicating the GPS range estimates computed at the second mobile to the first mobile; and
(h) computing absolute positions of the first and second GPS mobiles using a system of pseudorange equations including at least six pseudorange equations, wherein the six equations respectively correspond to the six LOS paths and include the assumed positions of the respective first and second mobiles.

8. The method of claim 7 further comprising:
(i) computing a root mean square ("RMS") error associated with the estimated absolute position of the first GPS mobile;
(j) updating the assumed values for the first mobile if the RMS error exceeds predetermined threshold; and
(k) repeating step (h).

9. The method of claim 7 further comprising:
(i) computing a root mean square ("RM") error associated with the estimate absolute position of the first GPS mobile; and (i) communicating the absolute positions of the first and second mobiles from the first mobile to the second mobile if the RMS error does not exceed a predetermined threshold.

10. The method of claim 7, wherein step (h) further comprises, at the first mobile:
computing pseudoranges (1) between each OPS satellite visible to the first mobile and the assumed position of the first mobile and (2) between each GPS satellite visible to the second mobile and the assumed position of the second mobile; and
computing a pseudorange between the assumed position of the first mobile and the assumed position of the second mobile.

11. A system for determining absolute positions of at least two mobile communications devices, the system comprising:
at least first and second mobile communications devices each including a ranging transceiver module coupled to a position processing module, wherein the ranging transceiver module of each of the first and second mobiles can receive usable positioning information signals transmitted from at most three visible remotely located positioning information signal sources such that the position processing module in each of the first and second mobiles cannot determine its absolute position solely based on the usable received positioning information signals;
wherein each of the first and second mobiles includes a wireless data transceiver module coupled to the position processing module and for receiving first-to-second mobile position information carried on wireless communications signals transmitted between the first and second mobiles;
wherein the ranging transceiver module of each of the first and second mobiles is for establishing at least a predetermined number of line of sight ("LOS") communications signal reception paths between the first mobile or the second mobile and the remotely located positioning information signal sources visible to the first mobile or the second mobile; and
wherein the position processing module of each of the first and second mobiles is for computing the absolute positions of the respective first and second mobiles based on the first-to-second mobile position information and positioning information signals transmitted over the predetermined number of LOS paths by the sources visible to the first mobile or second mobile and received at the first mobile or the second mobile.

12. The system of claim 11, wherein the first-to-second mobile information includes the position of the first mobile relative to the second mobile, wherein the ranging transceiver modules of the respective first and second mobiles in combination (i) can receive positioning information signals transmitted from as few as three visible remote positioning information signal sources, and (ii) can establish at least five LOS paths to the as few as three visible remote sources.

13. The system of claim 11, wherein the ranging transceiver module of each of the first and second mobiles include; a time of day clock, wherein the first-to-second mobile information includes range and relative clock bias between the respective clocks of the first mobile and the second mobile, and wherein the ranging transceiver modules of the respective first and second mobiles in combination can establish at least six LOS paths to remote positioning information signal sources visible to the first mobile or the second mobile.

14. A system for determining absolute positions of at least two global positioning system ("GPS") mobile communications device comprising;
- at least first and second GPS mobiles each including a ranging transceiver module coupled to a position processing module, wherein the ranging transceiver module of each of the first and second GPS mobiles can receive usable GPS positioning information signals transmitted from at most three visible GPS satellites such that the position processing module in each of the first and second mobiles cannot determine its absolute position solely based on the usable received GPS positioning information signals;
- wherein the ranging transceiver modules of the respective the first and second GPS mobiles in combination can receive GPS information positioning signals from as few as three visible GPS satellites and can establish at least five line of sight ("LOS") communications signal reception paths between the as few as three GPS satellites and the first and second mobiles;
- wherein the first and second GPS mobiles each include a data transceiver module coupled to the position processing module and for receiving first-to-second mobile relative position information carried on wireless communications transmitted between the first and second mobiles;
- wherein the position processing modules of the respective first and second GPS mobiles perform the following processing steps:
  - (a) the position processing module at the first mobile obtains the first-to-second mobile relative position information based on wireless communications between the first and second mobiles;
  - (b) the position processing module at the first mobile assumes a position for the first mobile and computes an assumed position for the second mobile based on the relative position information;
  - (c) the position processing modules at the respective first and second mobile compute GPS range estimates based on the GPS positioning information signals transmitted to the ranging transceiver modules of the respective first and second mobiles on the five LOS paths:
  - (d) the data transceiver module at the second GPS mobile wirelessly communicates the GPS range estimates computed at the second mobile to the data transceiver module of the first mobile; and
  - (e) the position processing module at the first mobile computes absolute positions of the respective first and second GPS mobile's using a system of pseudorange equations including at least five pseudorange equations, wherein the five equations respectively correspond to the five LOS paths and include the assumed positions of the respective first and second mobiles.

15. The system of claim 14, wherein the position processing module of the first GPS mobile computes a root mean square error ("RMS") associated with the estimated absolute position of the first GPS mobile and updates the assumed value for the first mobile if the RMS error exceeds a predetermined threshold; and
- wherein the position processing modules of the respective first and second GPS mobiles repeat steps (c), (d) and (e).

16. The system of claim 14, wherein the position processing module of the first GPS mobile computes a root mean square error associated with the estimated absolute position of the first GPS mobile, and
- wherein the data transceiver module of the first GPS mobile communicates the absolute positions of the first and second mobiles from the first mobile to the second mobile if the RMS error does not exceed a predetermined threshold.

17. A system for determining absolute positions of at least two global positioning system ("GPS") mobile communications devices comprising:
- first and second GPS mobiles each including a ranging transceiver module coupled to a position processing module, wherein the ranging transceiver module of each of the first and second mobiles can receive usable GPS positioning information signals transmitted from at most three visible GPS satellites such that the position processing module in each of the first and second mobiles cannot determine its absolute position solely based on the usable received GPS positioning information signals,
- wherein the ranging transceiver modules of the respective first and second mobiles include time of day clocks and together can establish at least six line of sight ("LOS") communications signal reception paths with visible GPS satellites;
- wherein the modules of the respective first and second GPS mobiles perform the following steps:
  - (a) the position processing module at the first mobile assumes nominal positions for the respective first and second mobile and a GPS clock offset for the first mobile;
  - (b) the position processing module at the first mobile determines signal propagation time between the first mobile and the second mobile based on transmission of wireless communications signals from the ranging transceiver module of the first mobile to the ranging transceiver module of the second mobile;
  - (c) the position processing module at the second mobile determines signal propagation time between the first mobile and the second mobile based on transmission of wireless communications signals from the ranging transceiver module of the second mobile to the ranging transceiver module of the first mobile;
  - (d) the data transceiver module of the second GPS mobile wirelessly transmits the propagation time determined at the second mobile to the data transceiver module of the first mobile;
  - (e) the position processing module at the first mobile determines range between the first and second mobiles based on the signal propagation times measured at the first and second mobiles;
  - (f) the ranging transceiver modules at the respective first and second GPS mobiles compute GPS range estimates based on the GPS positioning information signals transmitted on the six LOS paths;
  - (g) the data transceiver module at the second module mobile wirelessly communicates the GPS range estimates computed at the second mobile to the data transceiver module of the first mobile; and
  - (h) the position processing module at the first GPS mobile computes absolute positions of the first and second GPS mobiles using a system of pseudorange equations including at least six pseudorange equations, wherein the six equations respectively correspond to the six LOS paths and include the assumed positions of the respective first and second mobiles.

18. The system of claim 17, wherein the position processing module the first GPS mobile computes a root mean square ("RMS") error associated with the estimated absolute position of the first GPS mobile, updates the assumed values for the first mobile if the RMS error exceeds a predetermined threshold and again performs step (h).

19. The system of claim 17, wherein the position processing module of first GPS mobile computes a root mean square ("RMS") error associated with the estimated absolute position of the first GPS mobile; and wherein the data transceiver module of the first mobile communicates the absolute positions of the first and second mobiles from the first mobile to the second mobile if the RMS error does not exceed a predetermined threshold.

20. The system of claim 17, wherein the position processing module at the first mobile in step (h):

computes pseudoranges (1) between each GPS satellite visible to the first mobile and the assumed position of the first mobile and (2) between each GPS satellite visible to the second mobile and the assumed position of the second mobile; and computes a pseudorange between the assumed position of the first mobile and the assumed position of the second mobile.

* * * * *